United States Patent [19]
Ferguson

[11] Patent Number: 6,012,592
[45] Date of Patent: Jan. 11, 2000

[54] BOOT RACK ASSEMBLY

[76] Inventor: Kenneth Ross Ferguson, 522 Pin Oak, Alvin, Tex. 77511

[21] Appl. No.: 09/131,493

[22] Filed: Aug. 10, 1998

[51] Int. Cl.[7] ........................................................ A47F 7/08
[52] U.S. Cl. .................................................................. 211/34
[58] Field of Search ......................................... 211/34, 37

[56] References Cited

U.S. PATENT DOCUMENTS

| | | | |
|---|---|---|---|
| D. 324,142 | 2/1992 | Cassel | D6/462 |
| D. 345,257 | 3/1994 | Dunlop | D6/316 |
| D. 378,252 | 3/1997 | Smith | D6/320 |
| 446,312 | 2/1891 | Wikle . | |
| 2,845,182 | 7/1958 | Atkinson . | |
| 3,589,522 | 6/1971 | Chiodo | 211/34 |
| 3,762,573 | 10/1973 | Collins et al. | 211/34 |
| 3,974,917 | 8/1976 | Waxmanski | 211/36 |
| 4,699,267 | 10/1987 | Burke | 206/278 |
| 5,172,816 | 12/1992 | Kline et al. | 211/37 |
| 5,566,838 | 10/1996 | Tseng . | |
| 5,617,959 | 4/1997 | Klein et al. | 211/307 |
| 5,685,440 | 11/1997 | Mason . | |

*Primary Examiner*—Alvin Chin-Shue
*Assistant Examiner*—Sarah Purol
*Attorney, Agent, or Firm*—Fulbright & Jaworski, L.L.P.

[57] ABSTRACT

The present boot rack assembly comprises a base member designed to extend along the bottom of a pickup truck bed, a boot receiving prong perpendicularly attached to the base member, a top member disposed parallel to the base member and designed to extend along the upper lip of a truck bed side wall, and a support member extending perpendicularly between and attached to the base member and the top member.

8 Claims, 1 Drawing Sheet

BOOT RACK ASSEMBLY

FIELD OF INVENTION

The present invention relates to a boot rack assembly designed to securely fit into the flatbed of a pick-up truck.

BACKGROUND OF THE INVENTION

Most workers in the construction, industrial, agricultural and various other industries use work boots on the job. Often, these work boots need to be stored, cleaned and/or transported on a daily basis.

Unfortunately, workers currently have few options of what to do with their work boots when they are not in use. Workers can continue to wear their boots when work is finished, but the boots after a hard day's work can make a mess in the interior of cars and on carpets. Also, wearing the boots when they are not needed prevents them from properly ventilating and drying between uses. Some workers throw their boots in the back of their personal or work trucks, but the boots are not secured and can get bumped out of the truck or damaged because they are in harm's way of other items loaded into the truck bed. Furthermore, the boots can fly around in the back of the truck bed and dirt, debris or rain can get inside the boot. Instead of storing the boots in the truck bed, other workers stuff their boots in the space between the cab and the bed of the pick-up truck, but this can damage or deform the boots. Also, the boots are susceptible to flying out of the truck while driving. Other workers store their boots on site, but this is disadvantageous when the worker moves in between job sites. What is needed is a convenient method of storing and transporting work boots.

SUMMARY

The present invention is directed to an apparatus that satisfies the need to properly secure and store work boots in the flat bed of a pick-up truck. A boot rack having features of the present invention comprises a base member, a boot-receiving prong, a support member and a top member. The base member is designed to extend along the bottom of a truck bed. The boot-receiving prong is perpendicularly attached to the base member at the bottom end of the boot-receiving prong. The support member is attached to and perpendicularly extends between the base member and the top member. The top member and the base member are disposed parallel to each other. The top member is designed to extend along the upper lip of the truck bed sidewall.

Other embodiments having features of the present invention include a boot rack comprising a plurality of boot-receiving prongs, a boot-receiving prong with a top end design to curve away from the truck bed sidewall, the support members have a means for adjusting the height of the support member, and/or a plurality of support members.

Another embodiment of the boot rack having features of the present invention comprises a U-shaped boot-receiving prong where the prong comprises two vertical members disposed generally parallel to each other and attached perpendicularly to the base member, and a top member of the boot-receiving prong disposed parallel to the base member and perpendicular to the two vertical members and integrally attached to the two vertical members.

Another embodiment of the present invention uses shoe-receiving prongs instead of boot-receiving prongs.

An object of the present invention is to provide a place to securely and conveniently store work boots and work shoes in the bed of a pick-up truck.

Another object of this invention is to provide a place to store work boots and work shoes so that rain, dirt and debris does not get into the interior of the work boots or work shoes.

Another object of the present invention is to provide a convenient place for the interior of work boots to ventilate and maintain the shape of the work boot between uses.

Another object of the present invention is to provide a convenient place to clean and dry work boots and work shoes.

Another object of the present invention is to provide a boot rack that will quickly and easily fit into the bed of any pick-up truck.

These and other features, aspects and advantages of the present invention will become better understood with reference to the following description and appended claims.

DETAILED DESCRIPTION OF THE INVENTION

The present invention endeavors satisfy a need of many of the workers who use work boots on the job. Generally, an embodiment of the invention has features including a frame which easily attaches to the side walls of a pick-up truck bed so that shoe-receiving prongs extend from a base member placed on the bottom of the truck bed along the sidewall of the truck bed. This configuration allows for work boots to be stored upside down by inserting the interior of the boot onto the boot-receiving prong.

Figure 1:
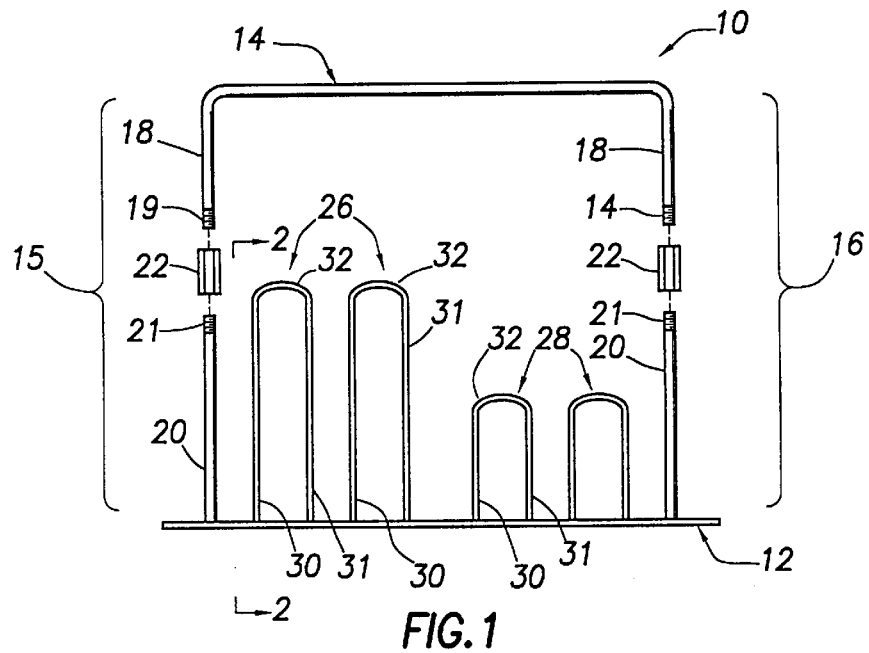
FIG. 1 presents a front view of an embodiment of the present invention.

FIG. 1 illustrates an embodiment of the present invention. The general support frame securing boot-receiving prongs 26 and shoe-receiving prongs 28 in place comprises left support member 15, right support member 16, base member 12 and top member 14. The bottom portions of boot-receiving prongs 26 and shoe-receiving prongs 28 are attached to base member 12 in any fashion known to the art, including welding or screws. Left support member 15 and right support member 16 are also connected to base member 12 by any method known to the art. Left support 15 and right support member 16 are attached at the ends opposite the ends attached to the base member 12 to top member 14. Top member 14 is designed to fit under the lip of the sidewall of a pick-up truck bed.

The embodiment of FIG. 1 is designed to fit into the bed of a pick-up truck. The bed of a pick-up truck generally comprises of a flat bottom, two sidewalls extending upwardly from the bottom of the truck bed along the side of the pick-up truck, a front cab wall extending upwardly from the bottom of the truck bed at the front of the trunk bed next to the cab portion of the truck, and a rear tailgate extending upwardly from the bottom of the truck bed in the rear of the pick-up truck. The sidewalls of the truck bed typically have a lip at the top of the sidewall which extends inwardly towards the center of the truck bed. The sidewalls of the truck bed will also typically have a wheel well in between the front cab wall and the rear tailgate.

The positioning of boot rack assembly against the sidewall of a truck bed has several advantages. First, it is easy to place work boots on the boot-receiving prongs 26 from outside of the truck bed. Second, the sidewall of the truck bed helps keep the boot in place on boot-receiving prong 26 by forcing the length of the boot between boot-receiving prongs 26 and the sidewall of the truck bed. Third, by placing boot rack assembly 10 along the side of the truck bed, the boots are stored out of the way of the interior truck bed which can be used for storage of other items.

The embodiment of FIG. 1 may be placed so that the top member 14 and the base member 12 run parallel to sidewall of a truck bed. Base member 12 is placed on the bottom of the truck bed near the sidewall. Top member 14 is placed up under the lip of the sidewall. Left support member 15 and right support member 16 are adjusted in height so that base member 12 exerts a force against the bottom of the truck bed and top member 14 exerts a force against the lip of the sidewall so that boot rack assembly 10 is firmly fixed in place in the truck bed. For example, boot rack assembly 10 may be placed along the sidewall of a truck bed between the front cab wall and the wheel well in the truck bed.

Figure 3:
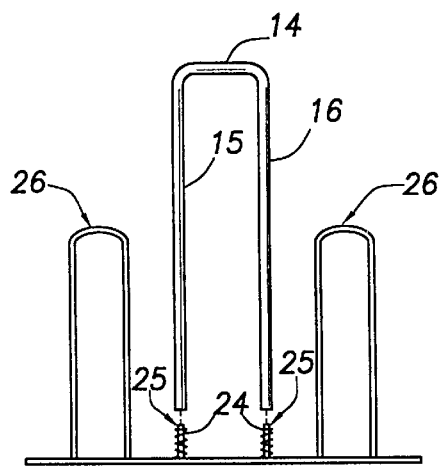
FIG. 3 presents a front view of an embodiment of the present invention.

Left support member 15 and right support member 16 are adjustable in length so that boot rack assembly can be fixed in place along the sidewall of the truck bed. In FIG. 1, each of the support members consist of a top support member 18 with threaded end 19 and a bottom support member 20 with threaded end 21. Top support member 18 is connected to bottom support member 20 with threaded coupling 22. Threaded coupling 22 screws onto threaded ends 19 and 21. The height of left support member 15 and right support member 16 are adjusted by turning threaded coupling 22 so that top support member 18 moves in relation to bottom support member 20. A skilled artisan will recognize that any number of methods to adjust the height of left support member 15 and right support member 16, both manual and automatic, may be used and still fall within the scope of the invention. For example, the height could be varied with springs, levers or pins inserted through holes in the concentric tube support members. FIG. 3 shows an embodiment of the present invention utilizing springs to adjust the height of the support members with springs 24 and spring retaining rods 25.

FIG. 1 shows both boot-receiving prongs 26 and shoe-receiving prongs 28. The primary difference between the two is that boot-receiving prongs 26 are longer to accommodate the longer dimension of a boot. The scope of the invention includes prongs for any type of footwear.

Boot-receiving prongs 26 of FIG. 1 generally have an upside down U shape. The U shape allows the boot to slide snugly onto the boot-receiving prong 26 so that first vertical member of 30 and second vertical member 31 of the boot-receiving prongs 26 press against the side of the boot to help keep it in place. The U-shape also helps the work boot maintain its shape during storage, much like a shoe tree. The U-shape also helps the interior of the boot to dry between uses by stretching the boot open and ensuring proper ventilation.

Figure 2:
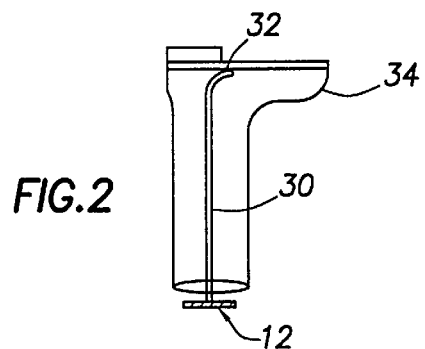
FIG. 2 is a side view of the embodiment of the present invention depicted in FIG. 1 with a mounted boot.

In an embodiment of the present invention, top portion 32 of boot-receiving prong 26 is bent as shown in FIG. 2. The curvature of top portion 32 allows boot-recieving prong 26 to more accurately replicate the interior of boot 34 so that boot 34 fits more snugly onto boot-receiving prong 26. The curved top portion 32 also makes it more difficult for the boot to accidently slide off during transport.

The boot-receiving prongs 26 of the embodiment of FIG. 1 have several advantages. The prongs allow the boots to be stored so that they are in an upside down position. When the boot is upside down, rain, water and debris cannot get into the interior of the work boot. Being upside down, the boots can also be cleaned with a hose without the concern of water getting into the interior of the boot. The positioning of the boot-receiving prongs 26 allow for easy storage and retrieval of the boots while standing on the ground outside of the pick-up truck.

Boot rack assembly 10 can have as many boot-receiving prongs 26 and shoe-receiving prongs 28 as needed. Typically, the prongs will come in pairs, one prong for each boot or shoe in a pair.

The description and diagrams of embodiments of the present invention are intended to promote an understanding of the invention and are not intended to limit the scope of the claimed invention. Further modifications, alterations or applications of the illustrated apparatus may fall within the scope of the invention.

I claim:

1. A boot rack for a truck bed having a truck bed bottom and a truck bed sidewall with an upper lip, comprising:
    a base member adapted to extend along the truck bed bottom;
    a boot-receiving prong having a bottom end and being perpendicularly attached to the base member at the bottom end of the boot-receiving prong;
    a support member having a bottom end and a top end, the support member being perpendicularly attached to the base member at the bottom end of the support member;
    a top member perpendicularly attached to the top end of the support member and adapted to extend parallel and adjacent to the upper lip of the truck bed sidewall of the truck bed while the base member extends along the truck bed bottom.

2. The shoe rack of claim 1, wherein said boot-receiving prong is a shoe-receiving prong.

3. The boot rack of claim 1, wherein the boot rack comprises a plurality of boot-recieving prongs.

4. The boot rack of claim 1, wherein the boot-receiving prong has a top end designed to curve away from the truck bed sidewall of the truck bed.

5. The boot rack of claim 1, wherein the boot-receiving prong comprises:

a first vertical member having a top end and a bottom end, the bottom end being attached to the base member and the first vertical member extending generally perpendicularly from the base member;

a second vertical member having a top end and a bottom end, the bottom end being attached to the base member and the second vertical member extending generally perpendicularly from the base member and extending generally parallel to the first vertical member; and a top member with a first end and a second end, the first end being integrally attached to the top end of the first vertical member, the second end being integrally attached to the top end of the second vertical member, the top member of the boot-receiving prong being disposed generally perpendicular to the first and second vertical members and being disposed generally parallel to the base member.

6. The boot rack of claim 1, wherein said support member has a means for adjusting the height of the support member.

7. The boot rack of claim 1, wherein the boot rack comprises a plurality of support members.

8. A shoe rack for a truck bed having a truck bed bottom and a sidewall with a lip, comprising:

a base member adapted to extend along the truck bed bottom;

a plurality of boot-receiving prongs having a bottom end perpendicularly attached to the base member and a top end designed to curve away from the sidewall of the truck bed;

a plurality of support members, each having a bottom end, a top end, and a means for adjusting the height of each support member, the bottom ends perpendicularly attached to the base member; and a top member perpendicularly attached to the top end of each of the plurality of support members and adapted to fit beneath the lip of the sidewall of the truck bed while the base member extends along the truck bed bottom.

\* \* \* \* \*